United States Patent [19]
Yasuda et al.

[11] Patent Number: 5,914,591
[45] Date of Patent: Jun. 22, 1999

[54] SWITCHING POWER SUPPLY

[75] Inventors: Hiroshi Yasuda, Hirakata; Syuji Tamaoka, Nagaokakyo, both of Japan

[73] Assignee: Matsushita Electric Industrial Co., Ltd., Osaka, Japan

[21] Appl. No.: 08/993,579

[22] Filed: Dec. 18, 1997

[30] Foreign Application Priority Data

Dec. 25, 1996 [JP] Japan ..................... 8-344850

[51] Int. Cl.⁶ .................. G05F 1/44; G05F 1/618
[52] U.S. Cl. .................. 323/284; 323/224; 323/225; 323/901
[58] Field of Search .................. 323/222, 223, 323/224, 225, 282, 284, 288, 349, 351, 901

[56] References Cited

U.S. PATENT DOCUMENTS

| | | | |
|---|---|---|---|
| 4,618,812 | 10/1986 | Kawakami | 323/224 |
| 5,565,761 | 10/1996 | Hwang | 323/222 |
| 5,642,267 | 6/1997 | Brkovic et al. | 323/224 X |

FOREIGN PATENT DOCUMENTS

| | | |
|---|---|---|
| 8-32158 | 3/1996 | Japan . |
| 8-32159 | 3/1996 | Japan . |

*Primary Examiner*—Peter S. Wong
*Assistant Examiner*—Y. J. Han
*Attorney, Agent, or Firm*—Wenderoth, Lind & Ponack, L.L.P.

[57] ABSTRACT

Switching power supplies are employed in electronic equipment using batteries as the power source, for the purposes of operating such equipment with a smaller number of batteries and of extending battery life. A switching power supply can efficiently supply stable voltages even when the battery voltage is lower or higher than the load voltage. Two mutually inverted triangular waves are generated by two triangular-wave generator circuits. Signals proportional to the voltage level from either a primary switching circuit for stepping down the input voltage or a secondary switching circuit for stepping up the input voltage are compared against the two triangular waves and pulse signals are generated. Using these pulse signals, the primary and secondary switching circuits are controlled.

15 Claims, 8 Drawing Sheets

SWITCHING POWER SUPPLY

BACKGROUND OF THE INVENTION

1. Field of the Invention

The present invention relates to a step-up/step-down switching power supply that is used in electronic equipment, etc., which employs batteries as the power source, and that provides output voltages which are higher or lower than the battery voltage.

2. Description of the Related Art

Switching power supplies have come into wide use in recent years in electronic equipment using batteries as the power source, for the purposes of operating such equipment with a smaller number of batteries and of extending battery life. We now describe one example of a conventional switching power supply, as noted above, making reference to the drawings. In FIG. 8, which is a circuit diagram of a conventional switching power supply, a transistor Q51 is turned on and off by pulses input from a comparator 7 through a resistor R53. First of all, when transistor Q51 is turned on, current flows to transistor Q51 from a battery 1 through the primary coil L51a of a flyback coil L51. At this time, the charge stored in a smoothing capacitor C3 flows through a diode D51 and a resistor R51 to charge a capacitor C51. Next, when Q51 turns off, the voltage on the collector of transistor Q51 becomes a higher voltage with the rise on the other terminal of a secondary coil 51b due to the flyback of the flyback coil L51 and due to the addition of the C51 voltage, and flows through a resistor R52 into the base of a transistor Q52. Transistor Q52, therefore, turns on, and, while transistor Q51 is on, the energy stored in the primary coil L51a of L51 passes through transistor Q52 and is stored on capacitor C3. Diode D51 here is for the purpose of preventing the charge on capacitor C51 from flowing back to capacitor C3 so that it will effectively flow into the base of transistor Q52. Capacitor C2 is for the purpose of absorbing the ripple current that flows into the flyback coil L51. A capacitor C52 is for the purpose of preventing oscillation in transistor Q52.

Next, the voltage on the capacitor C3—that is, the voltage applied to a load circuit 13 that operates the electronic equipment using the batteries—is divided by a series circuit made up of a resistor R1, a variable resistor VR1, and a resistor R2, and is amplified by an operational amplifier 2 to which the difference in voltage relative to a reference voltage source 3 has been fed back. The purposes of the capacitor C1 are to increase the low-band gain and reduce steady-state deviation, and to have the high-pass gain limited by a resistor R3 so that it does not oscillate. Next, the output from the operational amplifier 2 is compared by a comparator 7 with the triangular wave that is the output of a triangular-wave generator circuit 51, pulse-width-modulated (hereinafter abbreviated PWM), and made to drive transistor Q51 through resistor R53.

Here, the voltage is controlled in the following way. When the voltage of the battery 1 is lower than the load voltage across both terminals of capacitor C3, transistor Q51 is PWM-driven with a duty corresponding to that voltage difference, and operates as a step-up switching power supply, whereas, when the voltage of the battery 1 is higher than the load voltage across both terminals of the capacitor C3, the PWM duty becomes smaller, the charge stored in capacitor C51 decreases, the base current at transistor Q52 drops, and the potential difference between the collector and emitter in transistor Q52 opens up.

Besides this, a switching power supply is disclosed in the specification of laid-open patent application No. H2-51357 (1990).

SUMMARY OF THE INVENTION

The conventional switching power supply discussed above, however, is problematic in that its efficiency is poor, due to the fact that the voltage is controlled by the potential difference between the collector and emitter in the transistor Q52 opening up when the voltage of the battery 1 is higher than the load voltage across the two terminals of the capacitor C3.

An object of the present invention, which is intended to resolve the problem noted above with the prior art, is to provide a switching power supply that is highly efficient, irrespective of whether the voltage of the battery 1 is lower or higher than the load voltage across the two terminals of the capacitor C3.

The switching power supply, based on a first point of view of the present invention, for the purpose of resolving the problem noted above, is a switching power supply that includes a step-down switching circuit for stepping down input voltages, a step-up switching circuit for stepping up input voltages, coils connected to the step-down and step-up switching circuits for storing and discharging energy, a capacitor for smoothing outputs from the step-down and step-up switching devices. The switching power supply also includes an amplifier for comparing a voltage on the capacitor against a reference voltage, and amplifying the same, a primary triangular-wave generator circuit, a secondary triangular-wave generator circuit having outputs in a voltage range which differs from that of the primary triangular-wave generator circuit, a primary comparator that drives the step-down switching circuit according to the results of comparing the output of the amplifier against the output of the primary triangular-wave generator circuit, and a secondary comparator that drives the step-up switching circuit according to the results of comparing the output of the amplifier against the output of the secondary triangular-wave generator circuit.

The switching power supply, based on a second point of view, is the switching power supply based on the first point of view, wherein the secondary or primary triangular-wave generator circuit is configured so as to synthesize waveforms based on the output from the primary or secondary triangular-wave generator circuit.

The switching power supply, based on a third point of view, is the switching power supply based on the first point of view, wherein the primary or secondary triangular-wave generator circuit is configured so that it is synchronous with an external clock.

The switching power supply, based on a fourth point of view, is the switching power supply based on the first point of view, wherein the output of the primary triangular-wave generator circuit and the output of the secondary triangular-wave generator circuit bear a relationship of being mutually inverted with respect to a certain potential.

The switching power supply, based on a fifth point of view, is the switching power supply based on the first point of view, which has a pulse generator circuit that generates pulses which are synchronized with either the primary or secondary triangular-wave generator circuit, and which is configured so that a duty limitation is applied to the step-up switching circuit by output from the pulse generator circuit.

The switching power supply, based on a sixth point of view, is the switching power supply based on the first point of view, wherein the step-down switching circuit includes a first transistor, connected in series between the power supply and the coil, and a first diode, connected between the coil side of the first transistor and ground.

The switching power supply, based on a seventh point of view, is the switching power supply based on the first point of view, wherein the step-up switching circuit includes a second transistor, connected between the load side of the coil and ground; and a second diode, connected in series between the load and the coil.

The switching power supply, based on an eighth point of view, is the switching power supply based on the first point of view, wherein the step-down switching circuit comprises: the primary transistor, connected in series between the power supply and the coil, and a third transistor, connected between the coil side of the first transistor and ground, and wherein the first and third transistors perform mutually opposite on/off actions.

The switching power supply, based on a ninth point of view, is the switching power supply based on the first point of view, wherein the step-up switching circuit includes the second transistor, connected between the load side of the coil and ground, and a fourth transistor, connected in series between the load and the coil, and wherein the second and fourth transistors perform mutually opposite on/of actions.

DESCRIPTION OF THE PREFERRED EMBODIMENTS

Figure 1:
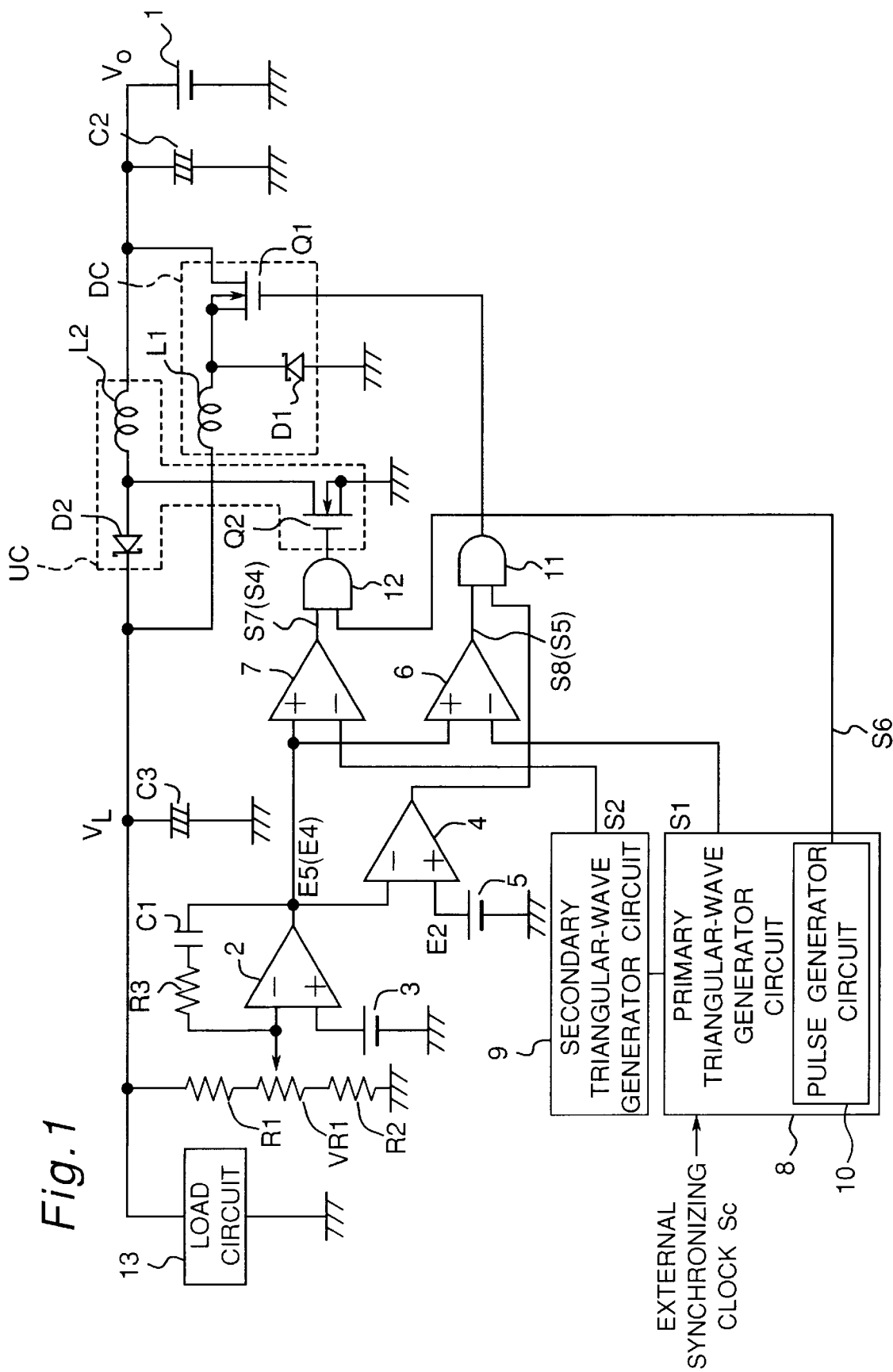
FIG. 1 is a block diagram depicting a switching power supply that is a first embodiment of the present invention.
Figure 2:
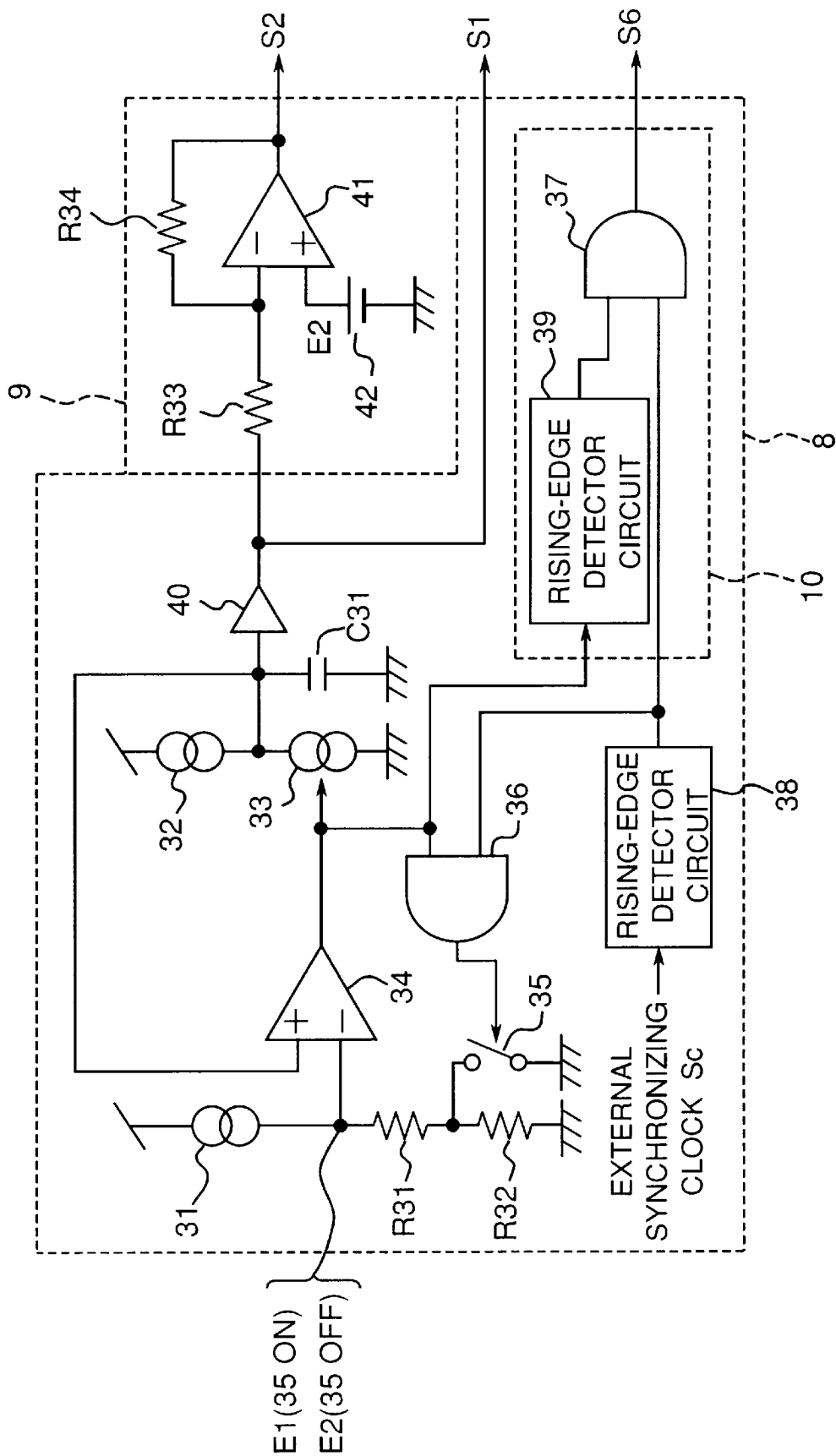
FIG. 2 is a block diagram depicting the primary triangular-wave generator circuit 8 and secondary triangular-wave generator circuit 9 depicted in FIG. 1.

A detailed description of a first embodiment of the present invention will now be given, making reference to the drawings. FIG. 1 is a block diagram of a switching power supply that is the first embodiment of the present invention. FIG. 2 is a block diagram of a primary triangular-wave generator circuit 8 and a secondary triangular-wave generator circuit 9.

In FIG. 1, the positive voltage of a battery 1 connected, in parallel with an electrolytic capacitor C2, is connected to the drain of an n-type MOS transistor Q1 that is a primary switching device, the source of which is connected to one terminal of a coil L1 and to the cathode of a diode D1, the anode of which is connected to ground. The other terminal of the coil L1 is connected to the positive terminal of an electrolytic capacitor C3 which is connected in parallel with a load circuit 13 that operates electronic equipment which uses batteries. The positive terminal of the battery 1 is also connected to the positive terminal of the capacitor C3 through a coil L2 and a diode D2. From a point of connection between the coil L2 and the anode of the diode D2 a connection is made to the drain of an N-type MOS transistor Q2 that configures a second switching device, the source of which is connected to ground.

Transistor Q1, coil L1, and diode D1 configure a step-down switching power supply (down converter) DC, while transistor Q2, coil L2, and diode D2 configure a step-up switching power supply (up converter) UC. As will be explained below, when transistor Q2 is turned off, a pulse signal S8 (cf. FIG. 3G) is sent to transistor Q1, the step-down switching power supply DC is driven, and current from battery 1 is accumulated in coil L1, smoothed by capacitor C3, and applied to the load circuit 13. The step-down switching power supply DC is driven when the voltage Vo of battery 1 is higher than the voltage VL applied to the load circuit 13.

When transistor Q1 is turned off, a pulse signal S4 (cf. FIG. 3C) is sent to transistor Q2, the step-up switching power supply UC is driven, and current from battery 1 is accumulated in coil L2, smoothed by capacitor C3, and applied to the load circuit 13. The step-up switching power supply UC is driven when the voltage Vo of battery 1 is lower than the voltage VL applied to the load circuit 13.

Parallel with the electrolytic capacitor C3, a resistor R1, a variable resistor VR1, and a resistor R2 are connected in series. The variable terminal of the variable resistor VR1 connects the series circuit of a capacitor Cl and a resistor R3 between the output terminal of operational amplifier 2 and the negative input terminal. To the positive input terminal of operational amplifier 2 is connected the positive terminal of a reference voltage source 3. The output from the operational amplifier 2 is divided three ways, with the first branch connected to the positive input terminal of a primary comparator 6, that has its negative input terminal connected to the output S1 from the primary triangular-wave generator circuit 8. The second branch is connected to the positive input terminal of a secondary comparator 7 that has its negative input terminal connected to the output S2 from the secondary triangular-wave generator circuit 9. The third branch is connected to the negative input terminal of a comparator 4, the positive input terminal of which is connected a reference voltage source 5. The output from the comparator 4 is, together with the output from the primary comparator 6, input to an AND gate 11, and the output of the AND gate 11 is connected to the gate of transistor Q1 which is the primary switching device. The primary triangular-wave generator circuit 8 contains a pulse generator circuit 10 that outputs a pulse signal S6 by a trigger signal. The pulse signal S6 is, together with the output from the secondary comparator 7, input to an AND gate 12, and the output of the AND gate 12 is connected to the transistor Q2 which is the secondary switching device.

From the primary triangular-wave generator circuit 8 is output the triangular wave S1 that is diagrammed in FIG. 3A and that will be discussed in greater detail below. From the secondary triangular-wave generator circuit 9 is output the triangular wave S2 that is also diagrammed in FIG. 3A. The triangular waves S1 and S2 have symmetrical waveforms above and below the line of voltage E2.

First, a case when the battery voltage Vo is higher than the load voltage VL is explained. If the load voltage VL increases causing an increase the voltage at the output of the variable resistor VR1 such that the voltage at the output of VR1 is greater than the voltage of the reference voltage source 3, the output E5 (FIG. 3A) from the operational amplifier 2 decreases. Thus, the potential on the positive input terminal of the comparator 6 also decreases, and, from the comparator 6, the pulse signal S8 obtained by comparison with the triangular wave S1 is output with a narrowed pulse width. By means of the pulse width of the pulse signal S8 having become narrow, the circuitry functions such that the time transistor Q1 is turned on shortens, the supply of current from the battery 1 is lessened, and the load voltage VL is lowered.

If the load voltage VL decreases to decrease the voltage at the output of the variable resistor VR1 to be smaller than the voltage of the reference voltage source 3, the output E5 (FIG. 3A) from the operational amplifier 2 increases, but does not exceeding the voltage level E2. Thus, the potential on the positive input terminal of the comparator 6 also increases, and, from the comparator 6, the pulse signal S8 obtained by comparison with the triangular wave S1 is output with a widened pulse width. By means of the pulse width of the pulse signal S8 having become wide, the circuitry functions such that the time transistor Q1 is turned on becomes long, the supply of current from the battery 1 is increased, and the load voltage VL rises. In this manner, the load voltage VL is maintained at a predetermined level.

At this time, E5 is applied to the positive input terminal of the comparator 7, while the triangular wave S2 is what is applied to the negative input terminal thereof. And, since E5 is always less than S2, an L-level (LOW) signal is output from comparator 7, and transistor Q2 is kept in the off state.

Next, a case when the battery voltage Vo is lower than the load voltage VL is explained. If the load voltage VL decreases to decrease the voltage at the output of the variable resistor VR1 to be less than the voltage of the reference voltage source 3, the output E4 (FIG. 3A) from the operational amplifier 2 increases. Thus, the potential on the positive input terminal of the comparator 6 also increases, and, from the comparator 6, the pulse signal S8 obtained by comparison with the triangular wave S1 is output with a widened pulse width. By means of the pulse width of the pulse signal S8 having become wide, the circuitry functions such that the time transistor Q1 is turned on becomes long, the supply of current from the battery 1 is increased, and the load voltage VL rises.

If the load voltage VL increases causing an increase in the voltage at the output of the variable resistor VR1 such that the voltage of the output of VR1 is greater than the voltage of the reference voltage source 3, the output E4 (FIG. 3A) from the operational amplifier 2 decreases, but not below the voltage level E2. Thus, the potential on the positive input terminal of the comparator 6 also decreases, and, from the comparator 6, the pulse signal S8 obtained by comparison with the triangular wave S1 is output with a narrowed pulse width. By means of the pulse width of the pulse signal S8 having become narrow, the circuitry functions such that the time transistor Q1 is turned on shortens, the supply of current from the battery 1 is decreased, and the load voltage VL is lowered. In this manner, the load voltage VL is maintained at a predetermined level.

At this time, E4 is what is applied to the negative input terminal of comparator 4, while to the positive input terminal thereof E2 is applied from the reference voltage source 5, and, because E4 is always greater than E2, an L-level (LOW) signal is output from comparator 4, and transistor Q1 is kept in the off state.

In FIG. 2, to a current source 31 are connected resistors R31 and R32, in series, between the source and ground, while to the resistor R32 is connected, in parallel, a switch 35 that is configured by a transistor, etc. The output from a rising-edge detector circuit 38, that has as an input an external synchronizing clock signal Sc, is input to AND gates 36 and 37, respectively. From a point of connection between the current source 31 and the resistor R31, a connection is made to the negative terminal of a comparator 34. The output of comparator 34 is divided into three branches, with one branch on/off controlling current source 33, that being the current source out of two current sources 32 and 33, connected in series, which is connected in parallel with a capacitor C31. A point of connection between the current sources 32 and 33 is connected to the positive input terminal of comparator 34. A second output from the comparator 34 is input to an input terminal of AND gate 36. Switch 35 is controlled by the output from AND gate 36. The third output from the comparator 34 is connected to one of the inputs to AND gate 37, which generates pulse signal S6 through a rising-edge detector circuit 39. From a point of connection between the current sources 32 and 33 is generated, through a buffer 40, output S1 from the triangular-wave generator circuit 8. The output from the buffer 40 is also connected through a resistor R33 to the negative input terminal of the second triangular-wave generator circuit 9 which has a resistor R34 connected between its output terminal and its negative input terminal and has a reference voltage source 42 connected to its positive input terminal. Resistors R33 and R34 are to have the same value. The voltage value for the reference voltage source 42 is set to be roughly equal to the voltage calculated by the formula (current value for current source 31)×(R31+R32). The rising-edge detector circuit 39 and the AND gate 37 configure the pulse generator circuit 10.

Next, the operation of the primary triangular-wave generator circuit 8 and secondary triangular-wave generator circuit 9 is explained using FIG. 2. The rising-edge detector circuit 38 is a circuit that, while normally at the HIGH level, generates a LOW level for a specific time interval when there has been a rising edge from the external clock signal Sc. Similarly, the rising-edge detector circuit 39 is a circuit that, while normally at the HIGH level, generates a LOW level for a specific time interval when there has been a rising edge in the signal from the comparator 34.

The triangular signal S1 is generated by a capacitor C31 being repeatedly charged in the forward and then in the reverse direction. When the output from comparator 34 is LOW, the current source 33 is turned off, capacitor C31 is forward-charged by current from the current source 32, and the voltage gradually rises. At this time, because the output from the AND gate 36 is LOW, switch 35 is turned off, and voltage E2, equal to (current source 31 current value)× (R31+R32), is applied to the negative input terminal of comparator 34. The voltage from capacitor C31 is input to the positive input terminal of comparator 34, and, when this exceeds voltage E2, which is the level on the negative input terminal, equal to (current source 31 current value)×(R31+ R32), the output from comparator 34 goes HIGH. Here, if there is no rising edge in the external clock signal Sc, the output from the rising-edge detector circuit 38 is HIGH, so that the output from AND gate 36 also goes HIGH, switch 35 turns on, and a voltage E1, equal to (current source 31 current value)×(R31), is applied to the negative input terminal of comparator 34. In addition, the output from comparator 34 goes HIGH, which causes current source 33—which generates a current value larger than the current value of current source 32—to turn on, so that capacitor C31 is reverse-charged, whereupon the voltage on capacitor C31 gradually falls.

When it falls lower than voltage E1, which is the level on the negative input terminal of comparator 34 and equal to (current source 31 current value)×(R31), the output from comparator 34 goes LOW, and current source 33 turns off, so capacitor C3 is again forward-charged by current from current source 32. A triangular wave is generated by the repetition of this operation, and a waveform that is the same as the change in voltage on the terminals of capacitor C31 is output, through buffer 40, as the output S1 from the primary triangular-wave generator circuit 8.

As to the output from the buffer 40, a waveform that is symmetrically inverted by an operational amplifier 41 and by R33 and R34 which, respectively, have the same resistance values, is output as output S2 from the secondary triangular-wave generator circuit 9, referencing the reference voltage source 42 voltage E2, which is roughly equal to the voltage found as (current source 31 current value)×(R31+R32).

When comparator 34 changes from LOW to HIGH, the rising-edge detector circuit 39 generates a signal, and pulse signal S6 is sent out from the pulse generator circuit 10 through AND gate 37.

Also, when the output from comparator 34 is HIGH, if the external synchronizing clock signal Sc rises, a LOW pulse is sent out from the rising-edge detector circuit 38, which passes through the AND gate 36 to turn off switch 35, whereupon the voltage on the negative input terminal of comparator 34 rises, and the output from comparator 34 is inverted, becoming HIGH, resulting in a triangular wave that is synchronized with the external synchronizing clock signal Sc.

Next, the operation of the switching power supply is explained, making reference to the block diagrams therefor. First of all, when the voltage Vo of the battery 1 is higher than the load voltage VL across the terminals of capacitor C3, which is for smoothing the outputs from the primary and secondary switching devices, a step-down switching power supply DC is driven, making it operate as a step-down switching power supply. In this operation, when transistor Q1 turns on, current from battery 1 flows into capacitor C3 through transistor Q1 and coil L1, and magnetic energy is accumulated in coil 1. At this time current will now flow from battery 1 to diode D1. Next, when Q1 turns off, the energy stored in coil L1 is released, causing current to flow from ground to capacitor C3 through diode D1 and coil L1. By this means, the charge stored in capacitor C3, that is, the voltage across its terminals, is reduced. The voltage on capacitor C3 is divided by resistor R1, resistor R2, and variable resistor VR1, and amplified by operational amplifier 2 to which the voltage difference between the divided voltage and reference voltage source 3 is fed back by resistor R3 and capacitor C1. The purpose of capacitor C1 is to increase the low-band gain and diminish the steady-state deviation, and to have the high-pass gain limited by resistor R3 so that it does not oscillate.

Next, output E5 from operational amplifier 2 is compared, by the primary comparator 6, with the triangular wave S1 that is output from the primary triangular-wave generator circuit 8, and pulse signal S8 is output from comparator 6. This pulse signal S8 passes through the AND gate 11 and PWM-drives the transistor Q1. Here, AND gate 11 is driven by a voltage that has been elevated higher than the voltage of the battery 1, and a voltage is supplied that is sufficiently high to turn transistor Q1 on when HIGH. By this means, transistor Q1 is PWM-driven at a duty corresponding to the difference in voltage between the battery 1 voltage and the load circuit 13, thus configuring a step-down switching power supply.

Next, while the voltage Vo of the battery 1 is lower than the load voltage VL across the terminals of capacitor C3, when the transistor Q2 turns on, current flows from battery 1 to transistor Q2 through coil L2, and magnetic energy is accumulated in coil L2. The charge that is stored by capacitor C3 at this time is prevented from flowing backward by the diode D2, and C3 thus does not discharge. Next, when transistor Q2 turns off, its drain voltage rises due to the flyback from coil L2, the energy accumulated in coil L2 while transistor Q2 was on flows into capacitor C3 through diode D2, and capacitor C3 is charged. The voltage on capacitor C3 is divided by the resistors R1 and R2 and the variable resistor VR1, and amplified by operational amplifier 2 to which the difference in voltage with the reference voltage source 3 is fed back by resistor R2 and capacitor C1. Next, output E4 from operational amplifier 2 is compared, by comparator 7, with triangular wave S2 that is output from the secondary triangular-wave generator circuit 9, and pulse signal S4 is output from comparator 7. This pulse signal S4 passes through AND gate 12 and drives transistor Q2.

In addition, the AND gate 12 has, as an input, pulse signal S6 which is generated by the pulse generator circuit 10 and in which the LOW-level period has a constant width, thereby forcing transistor Q2 to turn off at the peak point of the triangular wave S2. By this means, a duty limitation is enforced, preventing voltage E4 from exceeding voltage E3, transistor Q2 from continuing to be turned on, and a large current from flowing to L2.

As discussed in the foregoing, the transistor Q2 is PWM-driven at a duty which corresponds to the difference between the voltage of the battery 1 and the voltage on the load circuit 13, thus configuring a step-up switching power supply. Also, at this time, the output from operational amplifier 2 is compared by comparator 4 with reference voltage source 5, and, because it is higher than reference voltage source 5, comparator 4 outputs a LOW level, and stops the output from comparator 6 with the AND gate 11, causing transistor Q1 to turn off.

Figure 3A:
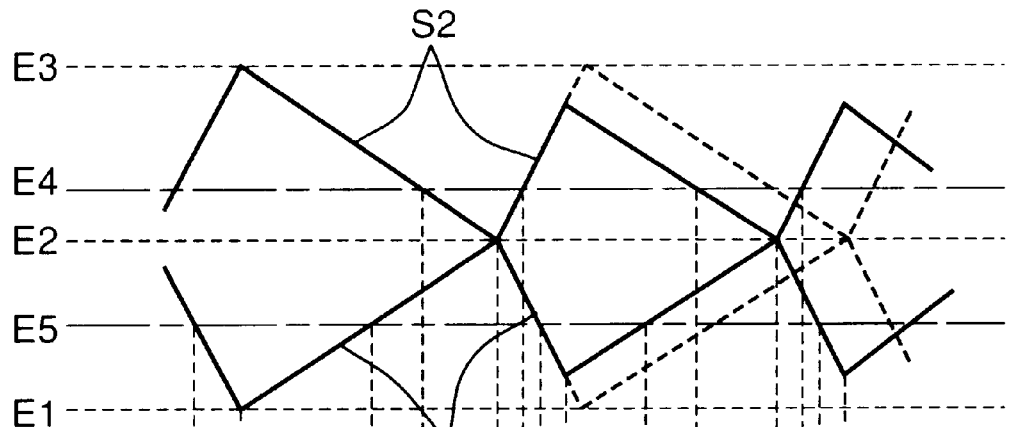
FIGS. 3A, 3B, 3C, 3D, 3E, 3F, 3G and 3H are output waveform diagrams for various components of the apparatus depicted in FIG. 1 and FIG. 2.
Figure 3B:
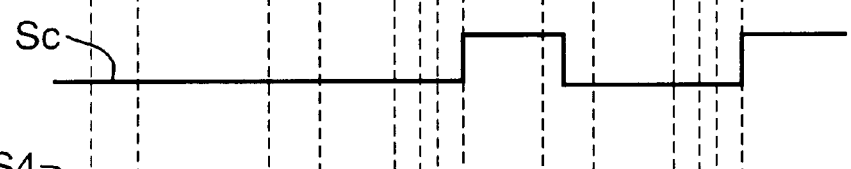

FIGS. 3A–3H are waveform diagrams for each part of the system. In FIG. 3A, S1 is the output waveform for the primary triangular-wave generator circuit 8, and S2 is the output waveform for the secondary triangular-wave generator circuit 9. In these waveforms S1 and S2, the broken lines represent the waveforms when no external synchronizing clock signal Sc is input, while the solid lines represent the waveforms when the external synchronizing clock signal Sc is input. FIG. 3B represents the external synchronizing clock signal Sc. E1 and E2 are threshold voltage levels that invert the output from the primary triangular-wave generator circuit 8. E1 is the voltage value represented by (current source 31 current value)×(R31), while E2 is the voltage value represented by (current source 31 current value)×(R31+R32). When no external clock signal is being input, triangular waves are generated between these two values. The configuration is such that the output of the secondary triangular-wave generator circuit 9 is generated in symmetry with the S1 output waveform from the primary triangular-wave generator circuit 8, with the axis of symmetry being the voltage value of the reference voltage source 42, which has roughly the same voltage value as the E2 voltage, and, when no external clock signal is being input, triangular waves are generated between the voltages E2 and E3. When the external clock signal Sc in FIG. 3B is input, the primary triangular-wave generator circuit 8 outputs a waveform like the one represented by the solid line, with the triangular wave on the E1 level side being inverted by the rising edge thereof.

Figure 3C:
Figure 3D:
Figure 3E:
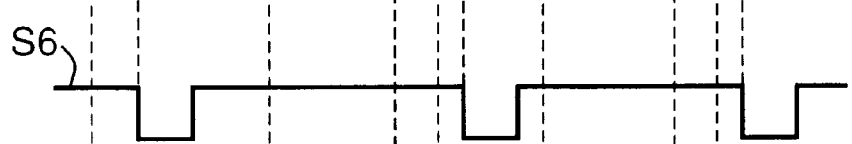

FIGS. 3C and 3D represent waveforms produced when the step-up switching power supply is operating, with FIG. 3C being the output waveform of comparator 7, and FIG. 3D being the output waveform of comparator 6. FIG. 3E is the output waveform of the pulse generator circuit 10. The output level from the operating amplifier 2 is positioned at E4, higher than the E2 voltage value, intersecting the S2 triangular wave. When the triangular wave S2 is lower than the E4 level, the output of comparator 7 goes HIGH, and the FIG. 3C waveform is output. The S1 triangular wave is always lower than the level of voltage E4, so the output from comparator 6 is always HIGH, as diagrammed in FIG. 3D. Also, the outputs from both rising-edge detector circuit 39 and rising-edge detector circuit 38 are input to the pulse generator circuit 10 through AND gate 37, so that the AND gate 37 output S6 is normally HIGH, as diagrammed in FIG. 3E, becoming a LOW signal for a certain time interval when an edge is detected by either of the rising-edge detector circuits 38 and 39. At this time, the output of comparator 4 is compared with reference voltage source 5, which has the same voltage value as the E2 voltage value, and a LOW level is output, so that a LOW level is input to Q1 through AND gate 11, Q1 is turned off, a signal resulting from ANDing the FIGS. 3C and 3E signals is input to transistor Q2, and the battery 1 voltage is raised.

Figure 3F:
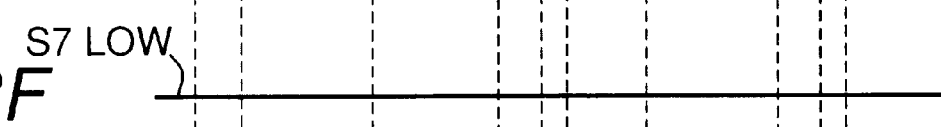
Figure 3G:
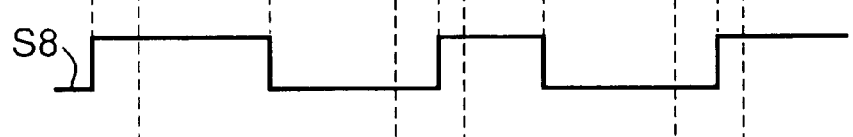

FIGS. 3F and 3G are waveforms produced when the step-down switching power supply is operating, with FIG. 3F being the output waveform of comparator 7, and FIG. 3G the output waveform of comparator 6. The output level of the operational amplifier 2 is positioned at E5, lower than the voltage value E2, while the S2 triangular wave is always higher than the E5 level. Therefore, the output from comparator 7 is always LOW, as at FIG. 3F, so that Q2 is turned off and the step-up circuit shuts down, and it intersects the S1 triangular wave. When S1 is lower than the E5 level, the output from comparator 6 goes HIGH and outputs the FIG. 3G waveform. Also, the output from comparator 4 goes HIGH because the voltage on reference voltage source 5 is higher, so the AND gate 11 outputs the same signal as FIG. 3G, and AND gate 11 is driven by a voltage that is elevated higher than the voltage of battery 1. Therefore a high voltage is supplied to transistor Q1 when the level is HIGH, becoming a HIGH-section interval ON, and Q1 is PWM-driven.

If the embodiment described in the foregoing is implemented, it is possible to freely and easily regulate the output voltage, both in a step-up operation where the voltage from battery 1 is lower than the load voltage, and in a step-down operation where the voltage from battery 1 is higher than the load voltage, by applying changes to the variable resistor VR1. High efficiency is attained in both cases, while the amplifier 2, which exhibits the characteristics of a filter with feedback through R3 and C1, is used by both the step-up switching power supply and the step-down switching power supply, and operates within the range of two triangular-wave levels. It is therefore possible to configure a switching power supply that does not exhibit voltage fluctuations when switching between the step-up switching power supply and the step-down switching power supply.

Figure 4:
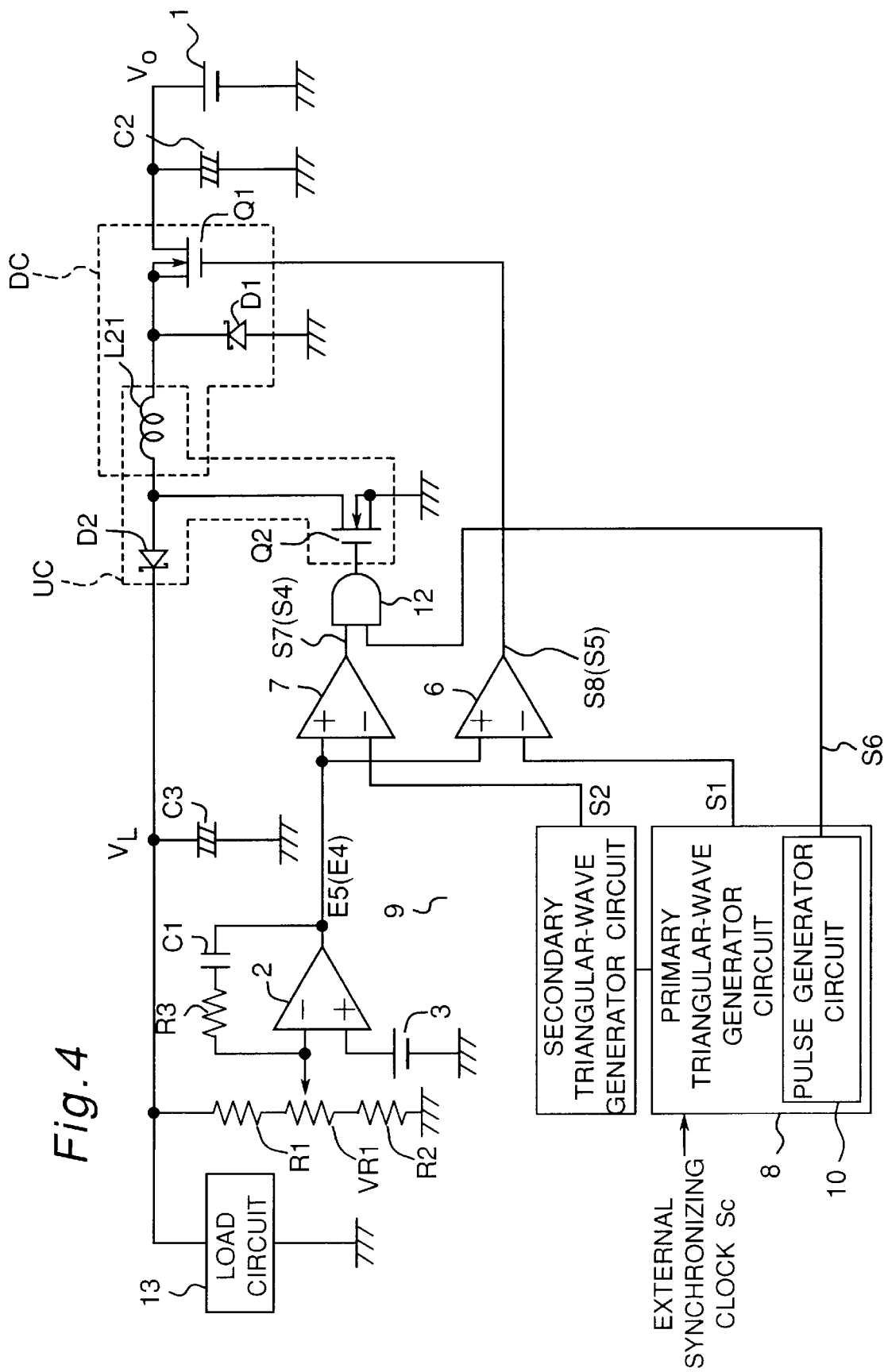
FIG. 4 is a block diagram depicting a switching power supply that is a second embodiment of the present invention.

Next, a second embodiment of the present invention is described. FIG. 4 is a circuit diagram of a switching power supply that is the second embodiment of the present invention. As indicated in FIG. 4, a single coil L21 is used to serve as a coil for both the step-down switching power supply and the step-up switching power supply. More specifically, a coil L21 is deployed in place of coil L1, and, after this coil L21, a diode D2 and a transistor Q2, which is the secondary switching device, are connected. Also, there is no comparator 4, reference voltage source 5, or AND gate 11. Other than that, this is the same configuration as seen in the first embodiment depicted in FIG. 1. The step-down switching power supply DC is made up of a transistor Q1, diode D1, and coil L21, while the step-up switching power supply UC is made up of a transistor Q2, diode D2, and coil L21.

First, a case when the battery voltage Vo is higher than the load voltage VL is explained. If the load voltage VL increases causing an increase in the voltage at the output of the variable resistor VR1 such that the voltage at the output of VR1 is greater than the voltage of the reference voltage source 3, the output E5 (FIG. 3A) from the operational amplifier 2 decreases. Thus, the potential on the positive input terminal of the comparator 6 also decreases, and, from the comparator 6, the pulse signal S8, obtained by comparison with the triangular wave S1, is output with a narrowed pulse width. By means of the pulse width of the pulse signal S8 having become narrow, the circuitry functions such that the time transistor Q1 is turned on shortens, the supply of current from the battery 1 is lessened, and the load voltage VL is lowered.

If the load voltage VL decreases causing a decrease in the voltage at the output of the variable resistor VR1 such that the voltage at the output of VR1 is smaller than the voltage of the reference voltage source 3, the output E5 (FIG. 3A) from the operational amplifier 2 increases, but not exceeding the voltage level E2. Thus, the potential on the positive input terminal of the comparator 6 also increases, and, from the comparator 6, the pulse signal S8, obtained by comparison with the triangular wave S1, is output with a widened pulse width. By means of the pulse width of the pulse signal S8 having become wide, the circuitry functions such that the time transistor Q1 is turned on becomes long, the supply of current from the battery 1 is increased, and the load voltage VL rises. In this manner, the load voltage VL is maintained at a predetermined level.

At this time, E5 is applied to the positive input terminal of the comparator 7, while the triangular wave S2 is what is applied to the negative input terminal thereof. And, since E5 is always less than S2, an L-level (LOW) signal is output from comparator 7, and transistor Q2 is kept in the off state.

Next, a case when the battery voltage Vo is lower than the load voltage VL is explained. If the load voltage VL decreases causing a decrease in the voltage at the output of the variable resistor VR1 such that the voltage at the output of VR1 is less than the voltage of the reference voltage source 3, the output E4 (FIG. 3A) from the operational amplifier 2 increases. Thus, the potential on the positive input terminal of the comparator 6 also increases, and, from the comparator 6, the pulse signal S8, obtained by comparison with the triangular wave S1, is output with a widened pulse width. By means of the pulse width of the pulse signal S8 having become wide, the circuitry functions such that the time transistor Q1 is turned on becomes long, the supply of current from the battery 1 is increased, and the load voltage VL rises.

If the load voltage VL increases causing an increase in the voltage at the output of the variable resistor VR1 such that the voltage of the output of VR1 is greater than the voltage of the reference voltage source 3, the output E4 (FIG. 3A) from the operational amplifier 2 decreases, but not below the voltage level E2. Thus, the potential on the positive input terminal of the comparator 6 also decreases, and, from the comparator 6, the pulse signal S8, obtained by comparison with the triangular wave S1, is output with a narrowed pulse width. By means of the pulse width of the pulse signal S8 having become narrow, the circuitry functions such that the time transistor Q1 is turned on shortens, the supply of current from the battery 1 is decreased, and the load voltage VL is lowed. In this manner, the load voltage VL is maintained at a predetermined level.

At this time, E4 is what is applied to the positive input terminal of comparator 6, while to the negative input terminal thereof is applied with the triangular wave S1, and, because E4 is always greater than S1, an H-level (HIGH) signal is output from comparator 6, and transistor Q1 is kept in the on state.

What is characteristic of the second embodiment, then, is that, when the output level of the operational amplifier 2 is the level of E4 in FIG. 3A, the output of the comparator 6 is HIGH (at a voltage raised higher than the voltage from the battery 1), so that, while transistor Q1 is held in the on state, and transistor Q2 is being PWM-driven, current is made to continue to flow to the coil L21. This second embodiment can be implemented with fewer components than the first embodiment, although, since transistor Q1 comes on line in series even when the step-up power supply is operating, efficiency is slightly sacrificed due to the internal resistance thereof. The circuitry diagrammed in FIG. 2 may also be applied to the primary triangular-wave generator circuit 8 and secondary triangular-wave generator circuit 9 in this embodiment.

Next, a third embodiment of the present invention is described.

Figure 5:
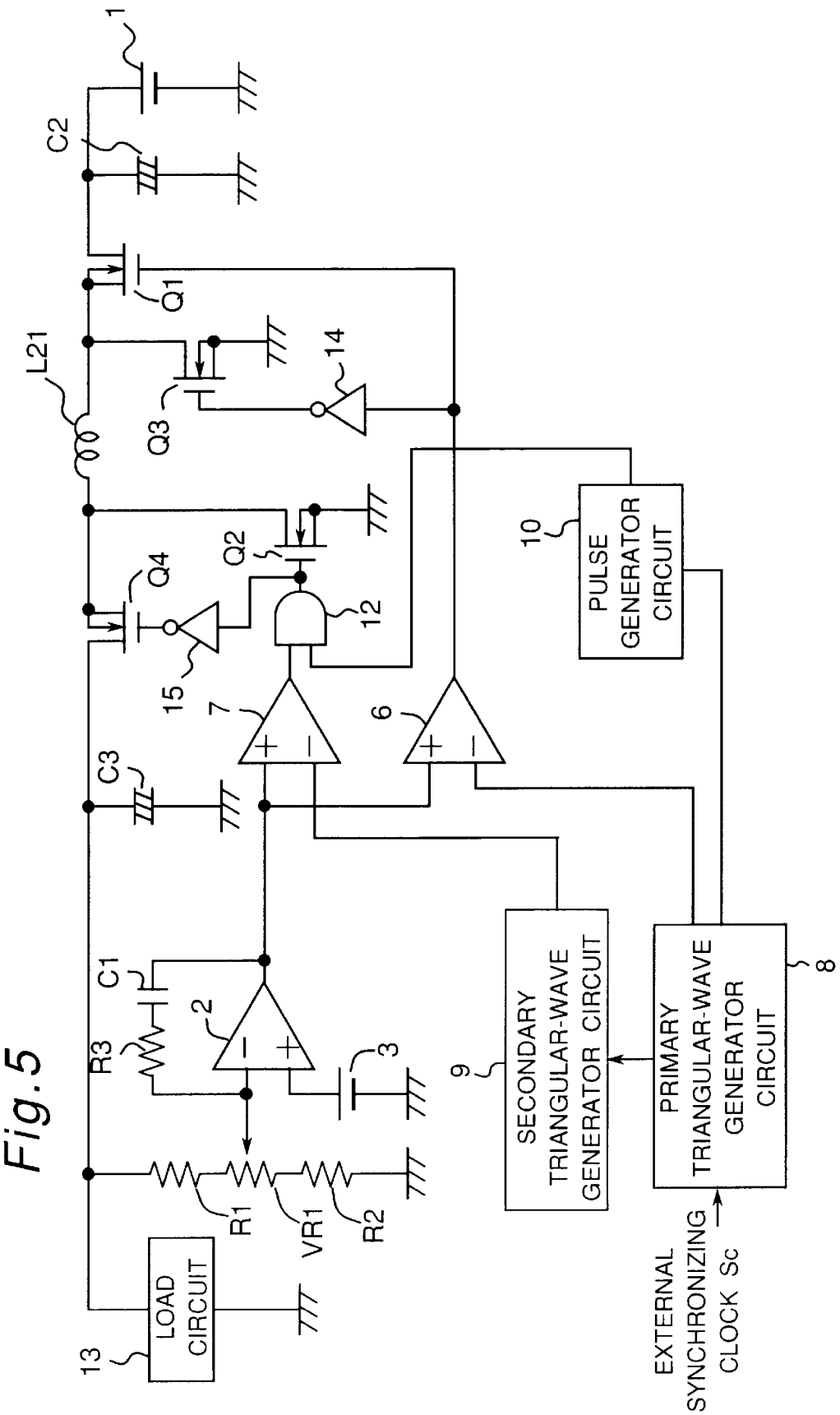
FIG. 5 is a block diagram depicting a switching power supply that is a third embodiment of the present invention.

FIG. 5 is a circuit diagram of a switching power supply in a third embodiment of the present invention.

In FIG. 5, an N-type MOS transistor Q3 is used in place of the diode D1 in FIG. 4, and an inverter 14 is used to drive this transistor Q3. To this inverter 14 is input the drive signal for the transistor Q1. Accordingly, transistors Q1 and Q3 perform operations that are mutually inverted. In addition, in FIG. 5, an N-type MOS transistor Q4 is used in place of the diode D2 in FIG. 4, and an inverter 15 is used to drive this transistor Q4. To this inverter 15 is input the drive signal for the transistor Q2. Accordingly, the transistors Q2 and Q4 perform operations that are mutually inverted. Otherwise, the configuration is the same as in FIG. 4.

Here, when the output level of the operational amplifier 2 is the level of E4 in FIG. 3A, the output from the comparator 6 goes HIGH (to a voltage raised higher than the voltage from the battery 1), so Q1 is held in the on state. When Q1 is turned on, the drive signal is inverted by the inverter 14, so Q3 is held in the off state. At this time, even while Q2 is being PWM-driven on and off, Q4 is inversely driven by the inverter 15, PWM-driven off and on, and current continues to flow to L21.

In this third embodiment, as compared to the second embodiment, the on-voltage for Q1 and Q2 is less than for D1 and D2, so efficiency is enhanced.

Furthermore, in this embodiment, the drives for Q3 and Q4 are provided merely by applying the inverted signals for Q1 and Q2. Alternatively, however, to prevent Q1 and Q3, or Q2 and Q4, from momentarily turning on at the same time, thereby allowing a through current to flow, timing circuitry may be provided to turn them off simultaneously.

Next, a fourth embodiment is described.

Figure 3H:
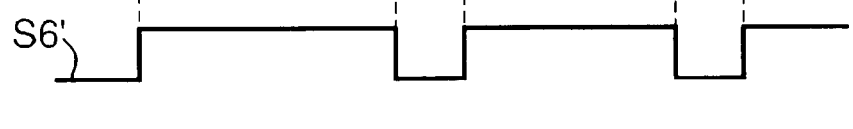
Figure 6:
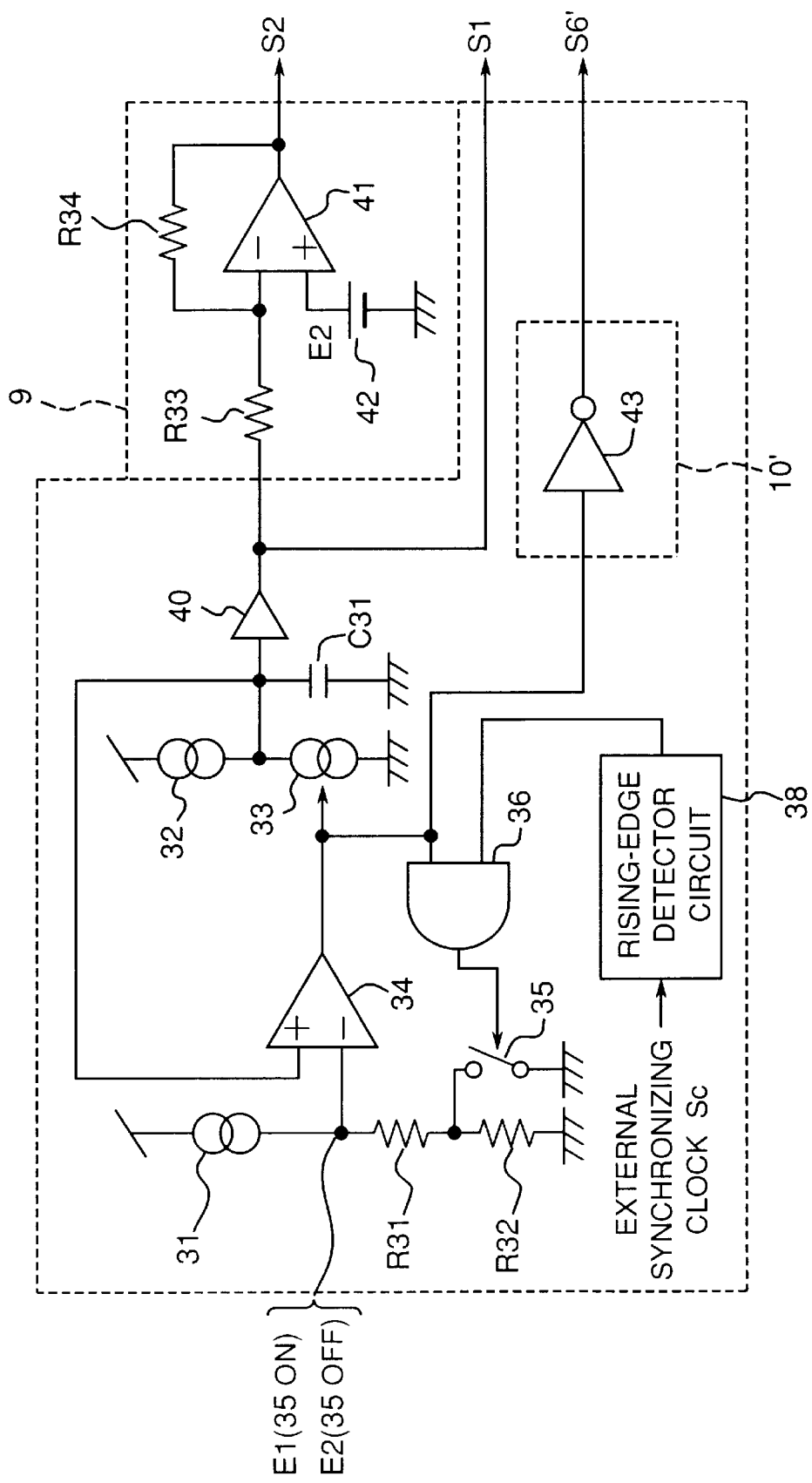
FIG. 6 is a block diagram depicting a switching power supply that is a fourth embodiment of the present invention.

In FIG. 6 is diagrammed a fourth embodiment of the present invention, which is particularly characterized by the pulse generator circuit 10' that is provided inside the primary triangular-wave generator circuit 8. This pulse generator circuit 10' includes an inverter 43, the input to which is connected to the output from the comparator 34. From this inverter 43 is output pulse signal S6' (FIG. 3H).

In the embodiments described above, a so-called one-shot circuit is used for the pulse generator circuit 10, with which a LOW signal is generated for a certain time after an edge has been detected. In this embodiment, however, a circuit that outputs a LOW signal while the comparator 34 is HIGH (that is, during the time that the output S1 from the primary triangular-wave generator circuit 8 is falling) is used.

The output waveform S6' of the inverter 43 is HIGH during the rising-edge interval of the triangular wave S1, and is LOW during the falling-edge interval. When this is so, a signal is input to Q2 that is produced by the AND gate 12 ANDing the signals S4 and S6', and the voltage from the battery 1 is stepped up. The falling-edge interval of the triangular wave S1 is sufficiently small compared to the leading-edge interval, so during this falling-edge interval transistor Q2 is turned off, and the step-up switching power supply UC is forced into a shut-down state.

Next, a fifth embodiment is described.

Figure 7:
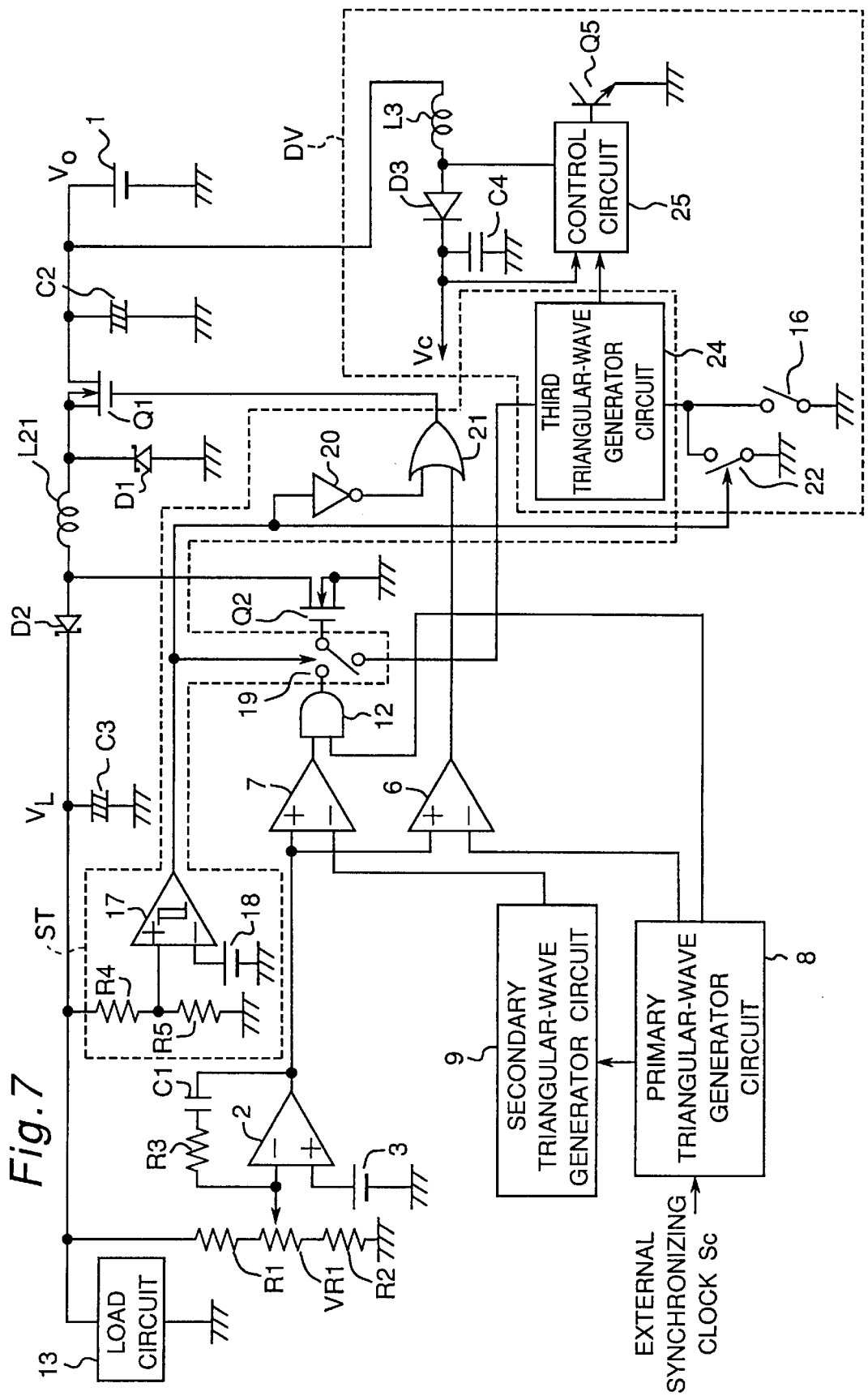
FIG. 7 is a block diagram depicting a switching power supply that is a fifth embodiment of the present invention.
Figure 8:
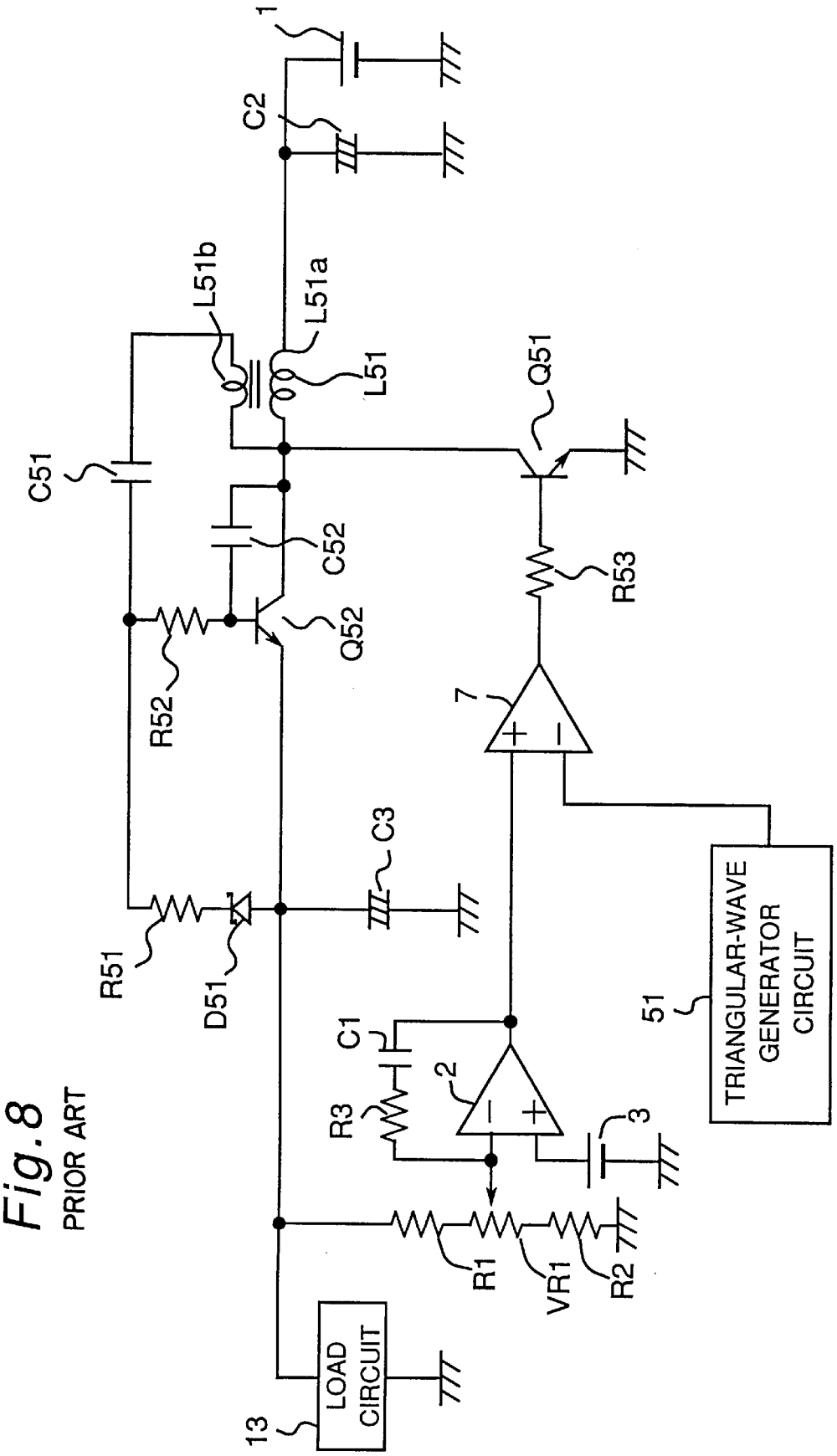
FIG. 8 is a block diagram depicting a conventional switching power supply.

FIG. 7 is a circuit diagram for a switching power supply in a fifth embodiment of the present invention. To the diagram in FIG. 4 has been added a starter circuit. This starter circuit is made up of a drive power circuit DV and a start signal generator circuit ST.

The drive power circuit DV is made up of a start switch 16, a holding switch 22, a third triangular-wave generator circuit 24, a controller circuit 25, a coil L3, a transistor Q5, a diode D3, and a capacitor C4. The holding switch 22 is turned off by the input of a LOW signal, and on by the input of a HIGH signal.

The start signal generator circuit ST is made up of a comparator 17 having hysteresis characteristics, a reference voltage source 18, resistors R4 and R5, a changeover switch 19, an inverter 20, and an OR gate 21. The changeover switch 19 works so that the base of transistor Q2 is connected to the third triangular-wave generator circuit 24 when the signal from the comparator 17 is LOW, and so that the base of transistor Q2 is connected to the output from AND gate 12 when that signal is HIGH.

The operation of the starter circuit configured as stated above will now be described.

When a start switch 16 is pressed, the third triangular-wave generator circuit 24 begins oscillating, the controller circuit 25 begins operating, and the transistor Q3 begins a switching operation that repeatedly turns on and off. A step-up operation is performed by the functions of a coil L3, diode D3, and capacitor C4, and the prescribed drive voltage Vc appears on capacitor C4. This drive voltage Vc provides the driving power for the C-MOS gates (AND gate 11, switch 19, OR gate 21, and inverter 20) that drive the MOS transistors Q1 and Q2, and is supplied to these devices 11, 19, 21, and 20.

At the start, when switch 16 is pressed, the load voltage VL charged on capacitor C3 is low. This low load voltage VL is voltage-divided by resistors R4 and R5 and compared with a reference source 18 by a comparator 17. When the load voltage VL is low, the comparator 17 outputs a LOW signal. This LOW signal is inverted by the inverter 20 and then applied to the OR gate 21, whereupon transistor Q1 is turned on. At this time, a LOW signal is also applied to switch 19, which is set in the position shown by the solid line in the diagram. This being so, switching signals from the third triangular-wave generator circuit 24 repeatedly turn transistor Q2 on and off. Transistor Q2, with this duty, begins to perform a PWM drive.

Before very long, when the load voltage VL begins to rise, the output of the comparator 17 will go HIGH, so the switch 19 will switch to the AND gate 12 contact, the input to the OR gate 21 will go LOW, and, as described above, operations based on the triangular-wave signals from the primary and secondary triangular-wave generator circuits 8 and 9 commence. Also, the HIGH signal from comparator 17 holds switch 22 in the on state, maintaining the drive power circuit DV so that it does not shut down even if the start switch 16 is turned off.

According to this embodiment, it is possible to use MOS transistors that require a high gate voltage, so that a highly efficient switching power supply can be provided.

More specifically, when this embodiment is implemented, a high gate voltage is generated by starting the drive power circuit DV in advance, making it possible to activate the MOS transistors of the step-down switching power supply DC and the step-up switching power supply UC, thereby providing a highly efficient switching power supply system. Even if the start switch 16 is omitted, the drive power circuit DV will not shut down, so that both the step-down switching power supply DC and the step-up switching power supply UC can continue operating.

The present invention, implemented in the embodiments described in the foregoing, makes double use of amplifiers as filter amps in both a step-up switching power supply and a step-down switching power supply. The invention is fashioned to provide automatic switching between step-up and step-down operations depending on which of the two triangular waves the filter amp output voltage corresponds to. Hence high efficiency is achieved, whether the battery voltage is lower or higher than the load voltage. Also, during switching between the step-up switching power supply and the step-down switching power supply, the operation switches continuously, without the filter amp operating point changing greatly, thus permitting a switching power supply configuration with which the output voltage does not fluctuate during switching. Furthermore, the step-up and step-down functions are not switched between by comparing the output voltage with the input voltage, so the output voltage can be stably and easily adjusted.

Also, in the description of the triangular-wave generator circuits diagrammed in FIG. 2, the voltage on the secondary triangular-wave generator circuit 9 is synthesized by the output from the primary triangular-wave generator circuit 8. This arrangement may be reversed, however, and the external synchronizing clock signal may be applied to the generator circuits in the reverse of the manner exemplified.

According to the present invention described in the foregoing, efficiency is high whether the battery voltage Vo is lower or higher than the load voltage VL, and amplifiers having filter characteristics serve doubly in both the step-up switching power supply and the step-down switching power supply. Also, the operation is within the range of two triangular-wave levels, making it possible to configure a switching power supply with which the voltage does not fluctuate when switching between the step-up switching power supply and the step-down switching power supply. Voltage adjustments can also be made continuously, stably, and easily by adjusting a variable resistor in one location. Hence the practical effectiveness is high.

What Is Claimed Is:

1. A switching power supply, comprising:
    a step-down switching circuit for stepping down input voltages;
    a step-up switching circuit for stepping up input voltages;
    coils connected to said step-down and step-up switching circuits for storing and discharging energy;
    a capacitor for smoothing outputs from said step-down and step-up switching circuits;
    an amplifier for comparing a voltage from said capacitor against a reference voltage, and amplifying the voltage from said capacitor;
    a primary triangular-wave generator circuit having outputs in a voltage range;
    a secondary triangular-wave generator circuit having outputs in a voltage range which differs from the voltage range of the outputs of said primary triangular-wave generator circuit;
    a primary comparator for driving said step-down switching circuit according to results of a comparison of an output of said amplifier against an output of said primary triangular-wave generator circuit; and
    a secondary comparator for driving said step-up switching circuit according to results of a comparison of an output of said amplifier against an output of said secondary triangular-wave generator circuit.

2. The switching power supply according to claim 1, wherein at least one of said secondary and primary triangular-wave generator circuits is configured so as to synthesize waveforms based on an output from said primary or secondary triangular-wave generator circuit, respectively.

3. The switching power supply according to claim 1, wherein at least one of said primary and secondary triangular-wave generator circuit is configured to be synchronized with an external clock signal.

4. The switching power supply according to claim 1, wherein an output of said primary triangular-wave generator circuit and an output of said secondary triangular-wave generator circuit bear a relationship of being mutually inverted with respect to a certain potential.

5. The according to claim 1, wherein said switching power supply comprises a pulse generator circuit for generating pulses which are synchronized with either said primary or secondary triangular-wave generator circuit, and configured so that a duty limitation is applied to said step-up switching circuit by an output from said pulse generator circuit.

6. The switching power supply according to claim 1, wherein said step-down switching circuit comprises a first transistor, connected in series between a power supply and one of said coils; and a first diode, connected between said one of said coils and said first transistor at one side of said diode and ground at another side of said diode.

7. The switching power supply according to claim 1 for use with a load, wherein said step-up switching circuit comprises a transistor, connected between a load side of one of said coils and ground; and a diode, connected in series between the load and said one of said coils.

8. The switching power supply according to claim 1, wherein said step-down switching circuit comprises a first transistor, connected in series between a power supply and one of said coils; and a second transistor, connected between said one of said coils and said first transistor at one side of said second transistor and ground at another side of said second transistor; wherein said first and second transistors are operable to perform mutually opposite on/off actions.

9. The switching power supply according to claim 1 for use with a load, wherein said step-up switching circuit comprises a first transistor, connected between a load side of one of said coils and ground; and a second transistor, connected in series between the load and said one of said coils; wherein said first and second transistors are operable to perform mutually opposite on/off actions.

10. A switching power supply, comprising:

a step-up switching circuit for stepping up input voltages;

coils connected to said step-up switching circuit for storing and discharging energy;

a capacitor for smoothing an output from said step-up switching circuit;

an amplifier for comparing a voltage from said capacitor against a reference voltage, and amplifying the voltage from said capacitor;

triangular-wave generator circuits containing switching circuits for generating falling-edge slopes and rising-edge slopes, and for generating triangular waves;

a comparator for comparing an output from said amplifier against at least one of the triangular waves from said triangular-wave generator circuits and for driving said step-up switching circuit; and a pulse generator circuit for generating pulses synchronized with said triangular-wave generator circuits;

wherein said pulse generator circuit is operable to impose a duty limitation to said step-up switching circuit.

11. The switching power supply according to claim 10, wherein said pulse generator circuit comprises an edge detector circuit for detecting edges of triangular waves.

12. The switching power supply according to claim 10, wherein said pulse generator circuit comprises a circuit for outputting pulses which are synchronized with either the falling-edge slope or the leading-edge slope.

13. A starter circuit for starting switching power supplies, comprising:

main power switching devices;

a main power capacitor for smoothing an output of said main power switching devices;

a main power controller circuit for controlling said main power switching devices so that a voltage on said main power capacitor becomes a prescribed voltage; and drive power circuit, having:
 a drive switching device;
 a drive capacitor for smoothing an output of said drive switching device and generating drive voltages; and
 a drive control circuit for controlling said drive switching device so that the drive voltage of said drive capacitor becomes a prescribed voltage and for driving said main power controller circuit based on the drive voltage.

14. The starter circuit according to claim 13, further comprising a triangular-wave generator circuit, and a switch-over circuit for performing, during start-up, control of said main power switching devices with said triangular-wave generator circuit.

15. The starter circuit according to claim 14, further comprises a switching element for holding said triangular-wave generator circuit in an operating state after said main power control circuit has been activated.

* * * * *